(12) United States Patent
Abourachid et al.

(10) Patent No.: US 9,471,061 B2
(45) Date of Patent: Oct. 18, 2016

(54) METHOD OF GENERATING COMMANDS FOR CONTROLLING COORDINATION OF DISPLACEMENT MEMBERS OF A MOVING PLATFORM AND CORRESPONDING GENERATOR

(75) Inventors: Anick Abourachid, Draveil (FR); Ludovic Maes, Epaignes (FR); Lionel Reveret, La Buisse (FR); Vincent Hugel, Massy (FR)

(73) Assignees: Inria Institut National de Recehrche en Informatique et en Automatique, Le Chesnay (FR); Université Versailles Saint-Quentin-en-Yvelines, Versailles (FR); Museum National D'Histoire Naturelle, Paris (FR); Centre National de la Recherche Scientifque (C.N.R.S.), Paris (FR)

(*) Notice: Subject to any disclaimer, the term of this patent is extended or adjusted under 35 U.S.C. 154(b) by 0 days.

(21) Appl. No.: 14/125,483

(22) PCT Filed: Jun. 11, 2012

(86) PCT No.: PCT/EP2012/060999
§ 371 (c)(1),
(2), (4) Date: Jun. 26, 2014

(87) PCT Pub. No.: WO2012/171874
PCT Pub. Date: Dec. 20, 2012

(65) Prior Publication Data
US 2014/0330477 A1   Nov. 6, 2014

(30) Foreign Application Priority Data

Jun. 17, 2011 (FR) .................................... 11 55348

(51) Int. Cl.
*G05D 1/02* (2006.01)
*B25J 9/16* (2006.01)
*B62D 57/032* (2006.01)

(52) U.S. Cl.
CPC ............ *G05D 1/021* (2013.01); *B25J 9/161* (2013.01); *B62D 57/032* (2013.01); *G05D 1/0223* (2013.01); *G05D 2201/0214* (2013.01)

(58) Field of Classification Search
CPC ...... B25J 9/161; B62D 57/032; G05D 1/021
USPC .......................................................... 701/23
See application file for complete search history.

(56) References Cited

U.S. PATENT DOCUMENTS 6,445,978 B1 * 9/2002 Takamura .............. A63H 11/00
                                                   700/17
6,616,456 B1 * 9/2003 Nalty .................... A63B 26/003
                                                   434/247

(Continued)

OTHER PUBLICATIONS

International Search Report of the International Searching Authority mailed on Dec. 13, 2012, along with its English translation, issued in connection with International Patent Appln. No. PCT/EP2012/060999 (5 pages).

*Primary Examiner* — Atul Trivedi
(74) *Attorney, Agent, or Firm* — Maynard, Cooper & Gale, P.C.; Brian Sattizahn

(57) ABSTRACT

The invention relates to a method for generating control commands for coordinating displacement members of a moving platform, so as to make said moving platform progress between an initial speed and a final speed according to at least two locomotive situations. The method of the invention is characterized in that each locomotive situation is associated with an elementary module corresponding thereto for generating commands for controlling coordination between a predetermined module start speed and a predetermined module end speed, and in that domains of application of these elementary modules are represented in the form of a predetermined charts for concatenating adjoining modules, covering at least partially, by juxtaposition of their start and end speeds, the spectrum of possible initial and final speeds of displacement of the platform, so as to allow determination of a series of elementary modules to be concatenated to pass from the initial speed to the final speed and the concatenation of the modules of this series so as to derive therefrom a series of corresponding control commands for the displacement members of the moving platform.

20 Claims, 7 Drawing Sheets

(56) References Cited

U.S. PATENT DOCUMENTS

| | | | | |
|---|---|---|---|---|
| 7,386,364 B2 * | 6/2008 | Mikami | ........... | B62D 57/02 318/443 |
| 8,180,486 B2 * | 5/2012 | Saito | ........... | G01S 5/0252 700/245 |
| 8,209,147 B2 * | 6/2012 | Solinsky | ........... | G01C 21/005 235/105 |
| 2002/0158599 A1 * | 10/2002 | Fujita | ........... | B25J 13/003 318/568.11 |
| 2006/0173578 A1 * | 8/2006 | Takenaka | ........... | B62D 57/032 700/245 |
| 2007/0156283 A1 | 7/2007 | Takenaka | | |
| 2007/0192910 A1 * | 8/2007 | Vu | ........... | B25J 5/007 700/245 |
| 2008/0009965 A1 * | 1/2008 | Bruemmer | ........... | G05D 1/0088 700/245 |
| 2009/0055019 A1 * | 2/2009 | Stiehl | ........... | B25J 9/1671 700/249 |
| 2010/0106356 A1 * | 4/2010 | Trepagnier | ........... | G01S 17/023 701/25 |
| 2010/0261526 A1 * | 10/2010 | Anderson | ........... | G06F 3/017 463/31 |
| 2012/0253234 A1 * | 10/2012 | Yang | ........... | A61B 5/1038 600/595 |

* cited by examiner

METHOD OF GENERATING COMMANDS FOR CONTROLLING COORDINATION OF DISPLACEMENT MEMBERS OF A MOVING PLATFORM AND CORRESPONDING GENERATOR

THE RELATED APPLICATIONS

This application is a U.S. National Phase Application under 35 U.S.C. 371 of International Application No. PCT/EP2012/060999 filed on Jun. 11, 2012, which was published on Dec. 20, 2012 under International Publication No. WO2012/171874 A2, which claims the benefit of French Patent Application No. 11 55348 filed on Jun. 17, 2011. The disclosures of these applications are incorporated herein by reference in their entireties.

The present invention relates to a method for generating commands for controlling coordination of displacement members of a moving platform, in order to have said moving platform progress between an initial speed and a final speed according to at least two locomotive situations.

The invention also relates to a corresponding generator and finds a preferential application in the fields of computer-generated imaging and of robotics.

In the state of the art, various examples of computer-generated imaging or robot models are known, more generally called moving platforms, having a plurality of displacement members or units, such as for example biped, quadruped, hexapod platforms.

Generally the moving platforms of the state of the art are built so as to accelerate or decelerate between an initial displacement speed and a final displacement speed without changing the displacement gait, therefore retaining a same type of coordination between the displacement members.

The displacement gait transitions, for example passing from walking to trotting for a quadruped platform, involve changes in the coordination characteristics between the displacement members of the moving platform. Nevertheless, the moving platforms known to the state of the art do not have the capability of carrying out changes in the displacement gait in a fluid and stable way.

In particular, robots known to the state of the art pass by a standstill and resumption of a new displacement gait in the case of a request for changing displacement gait, or achieve sudden changing without any gait transition.

Generally, the moving platforms of the state of the art are not able to handle the changes in locomotive situations in a stable and fluid way, the locomotive situations including displacement gaits and gait transitions.

It is therefore desirable to find a remedy to the drawbacks of the state of the art, by allowing fluid and stable displacement of a moving platform, notably in a situation of transition of displacement gait.

For this purpose, the invention proposes a method for generating commands for controlling coordination of displacement members of a moving platform, so as to make said moving platform progress between an initial speed and a final speed according to at least two locomotive situations. The method is characterized in that:

each locomotive situation is associated with a corresponding elementary module for generating commands for coordination between a predetermined module start speed and a predetermined module end speed, and application areas of these elementary modules are illustrated in the form of a predetermined chart for concatenating adjoining modules covering at least partially, by juxtaposition of their start and end speeds, the spectrum of possible start and end speeds of displacement of the platform, so as to allow the determination of a series of elementary modules to be concatenated to pass from the initial speed to the final speed and the concatenation of the modules of this series so as to derive therefrom a series of corresponding control commands for the displacement members of the moving platform.

Advantageously, the method for generating commands for coordination of displacement members according to the invention gives the possibility of obtaining a fluid and stable displacement of a moving platform for any time-dependent change in the locomotive situation, and natively in a gait transition situation, by the use of a concatenation chart. Thus, with the invention, it is in particular possible to have a moving platform move in a changing environment, for example with differences in height and obstacles.

The method for generating commands for controlling displacement coordination according to the invention may have one or several of the features below:

- the moving platform is a computer-generated imaging moving model,
- the moving platform is a robot,
- the elementary modules and said predetermined concatenation chart of the modules are obtained by modeling locomotive situations from observations of displacement of a living being,
- the living being is a biped and in that the locomotive situations comprise starting, stopping, walking and at least one running mode,
- the living being is a quadruped and in that the locomotive situations comprise starting, stopping, trotting, at least one walking type and at least one galloping type,
- the range of variation of the module start and end speeds is comprised between 15% and 25% of the maximum possible displacement speed of the platform,
- the locomotive situations include at least two displacement gaits and at least one gait transition, said moving platform progressing between the initial speed and the final speed according to at least two different displacement gaits, by passing through a gait transition,
- each elementary module delivers sequences of contact coordinates of these displacement members with a laying surface, in a space reference system and in a time reference system,
- during concatenation of the elementary modules, one of said displacement members is selected as a reference, and in that its space and time contact coordinates are used for determining the space and time origins at the inlet of the next elementary module from the sequence of elementary modules.

According to another aspect, the object of the invention is also a corresponding generator.

Other features and advantages of the invention will become apparent from the description which is given below thereof, as an indication and by no means as a limitation, with reference to the appended figures wherein.

Figure 1:
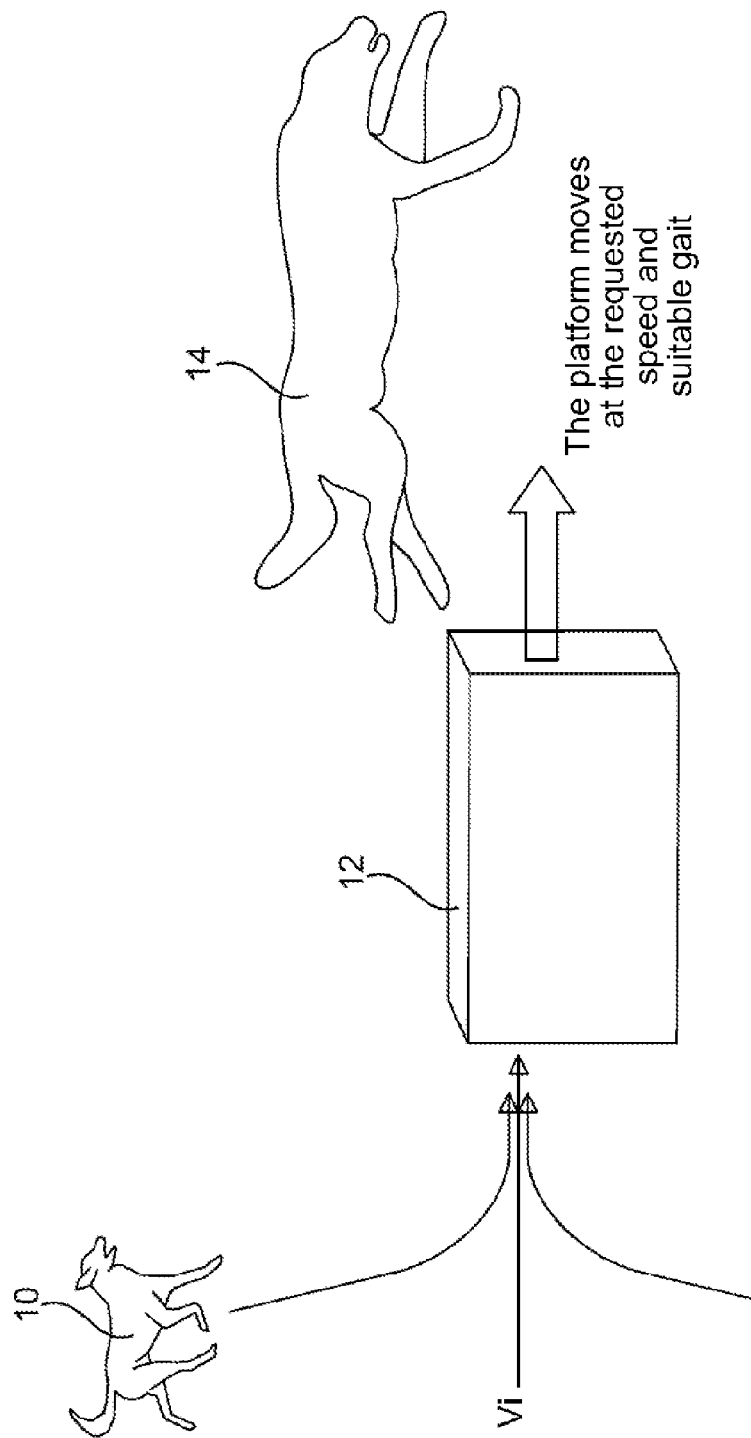
FIG. 1 is an illustrative diagram of an application of the invention.
Figure 2:
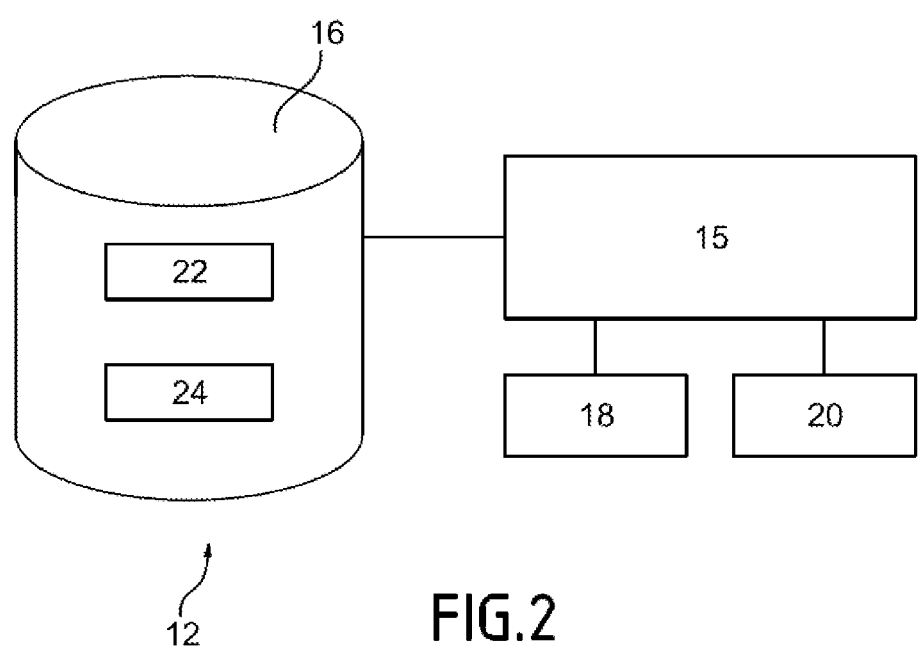
FIG. 2 is a schematic view of a device for generating commands for controlling displacement coordination according to the invention.

The invention will be described in the particular case of the generation of commands for controlling coordination of displacement members of a moving platform of the quadruped type, as illustrated in FIG. 1. More particularly, the displacement members are limbs or paws of the quadruped.

Morphological data of the quadruped 10 to be moved, such as for example the haunch height and the length of the trunk, as well as the initial displacement speed and the final displacement speed are provided at the input of a device for generating commands for controlling displacement coordination 12 comprising a software module capable of applying the method of the invention. At the output, the obtained displacement coordination control commands give the possibility of having the platform 14 progress at the suitable gait between the initial speed Vi and the final speed Vf.

The device 12 is for example a computer, notably comprising a processor 15, capable of executing computer program instructions, storage means 16, a man/machine interface 18 capable of receiving data, for example, commands from a user, and display means 20.

The storage means 16 are capable of storing one or several files 22 containing concatenation charts and a software module 24 comprising a computer program capable of applying the method of the invention when it is executed by the processor 15.

Figure 3:
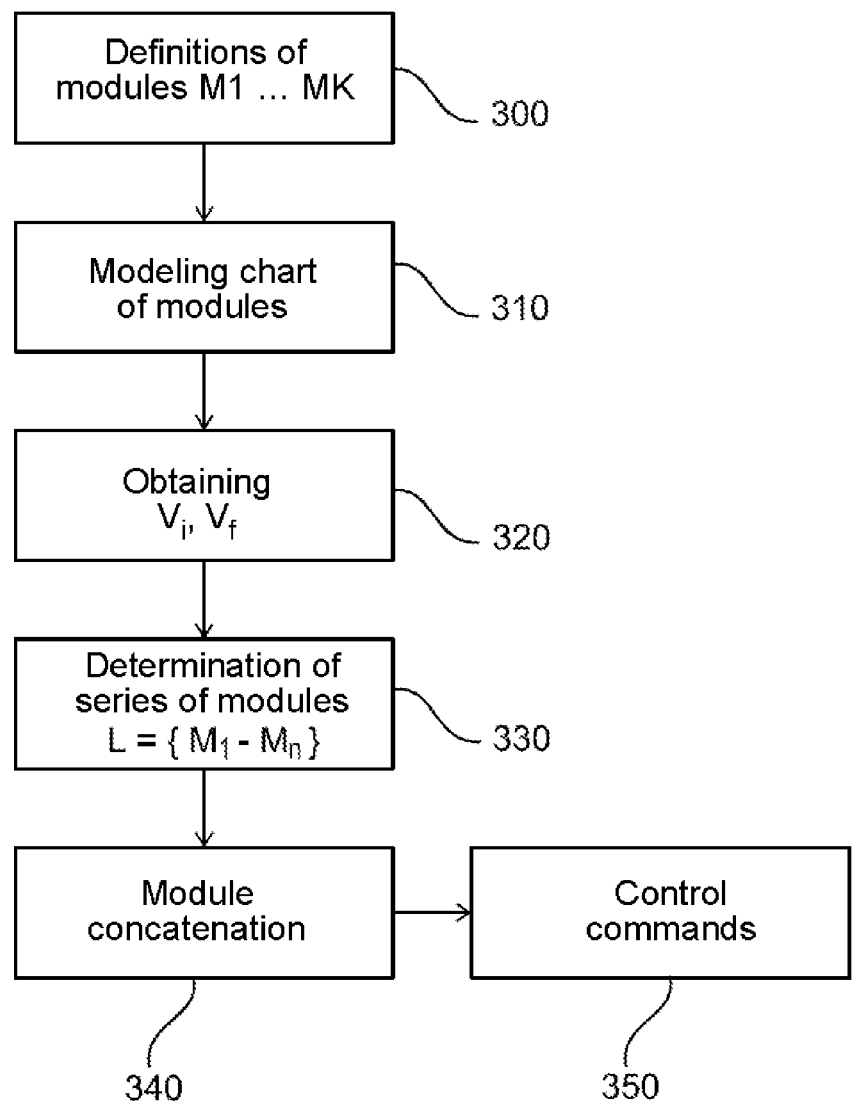
FIG. 3 is a flowchart of a method for generating commands for controlling displacement coordination according to an embodiment of the invention.

An embodiment of the method for generating commands for controlling coordination of displacement members is described in the flowchart of FIG. 3.

In a first step 300, elementary displacement modules $M_i$ are defined, each elementary module being associated with a locomotive situation, for example a displacement gait or a displacement gait transition. A displacement gait corresponds to a mode of coordination of the members of the moving platform in a cyclic, repeated and stable way. A gait transition corresponds to a time-dependent change in the coordination of the members between two gaits.

Each module generates commands for controlling coordination of the members of the moving platform between a given module start speed and a given module end speed. Preferably, these modules are defined on the basis of models from observations of the locomotion of living beings.

For example, with reference to the schematic example of FIG. 1, elementary modules are defined relatively to the displacement of a quadruped by observing the displacement gaits of a dog.

The contemplated locomotive situations for a quadruped comprise the following gaits: starting, stopping, trotting, several walking types and several galloping types. Indeed, biological observations on living beings have revealed several walking and galloping types. Moreover, depending on the type of quadruped, other locomotive gaits or situations, such as tölt, jump or half-jump are also contemplated. The contemplated locomotive situations also comprise gait transitions such as walking-trotting or trotting-galloping transitions, depending on the walking and galloping types.

In another application example, for a biped, the contemplated locomotive situations are: starting, stopping, walking gaits and several running modes like for example classic racing and hopping and the gait transition between walking and a given running mode.

In an embodiment, modeling in elementary locomotive situation modules adapted to a moving platform representing a virtual being, for example a cartoon or videogame monster, is obtained with computational modification of the modules obtained by biological observation, but taking into account the morphological data of the moving platform.

Next in a step 310, and also preferably on the basis of observations of natural displacement gaits of a living being, a chart for concatenating modules is defined. This chart gives the possibility of covering the spectrum of possible initial and final speeds for moving platform, thereby defining the areas of application of the defined elementary modules.

Preferably, the concatenation chart is normalized, the initial and final speeds being represented as a fraction of the maximum possible speed (Vmax) for the moving platform and varying between 0 and 1 respectively.

An example of a concatenation chart will be described in detail hereafter.

The concatenation chart is stored in memory in a file 22 stored in the storage means 16 of the device 12 applying the invention.

For a given moving platform 10, displacement speeds, respectively a normalized initial displacement speed Vi and a normalized final displacement speed Vf are obtained in step 320. These the speeds are either inputted by an operator or provided by a control software package of the moving platform.

In addition to the maximum speed Vmax of the moving platform, other morphological data are optionally provided in step 320, depending on the application.

For a given moving platform, in computer-generated imaging or robotics, parameters such as the haunch height and the length of the trunk are also provided in order to allow complete modeling of the movements of the displacement members by reverse kinematics.

For a moving model in computer-generated imaging, the whole of the coordination relationships between the displacement members which are the legs in the case of a quadruped, may be exactly copied on the displacement models obtained by observing living organisms.

When the moving platform is a robot, other constraints have to be taken into account: joints of the displacement members, elasticity, bulkiness of the legs.

The provided initial and final speeds are then used with the concatenation chart of the modules in step 330 in order to determine a series of elementary modules to be chained up together to pass from the initial speed Vi to the final speed Vf, while guaranteeing fluidity in the displacement of the moving platform.

Advantageously, the transitions of gaits to be applied are automatically determined by applying the concatenation chart. The step for determining a series of elementary modules 330 to be concatenated provides a list L of elementary modules $M_1$ to $M_n$, as well as a module start speed and a module end speed associated with the application of each of the modules. The start and end speeds of the modules to be concatenated together are also directly determined from the concatenation chart.

In practice, it is sufficient to store in memory the module end speeds of each module, the start speed of one module of the series being equal to the module end speed of the previous module in the series.

Next, in step 340, the elementary displacement modules are concatenated in order to obtain a coherent series of commands for controlling coordination of displacement members of a moving platform between the initial speed Vi and the final speed Vf. An embodiment of the step 340 for concatenation of the modules will be described hereafter with reference to FIG. 8.

Commands for controlling displacement coordination 350 are finally obtained by applying step 340. In an embodiment, these coordination control commands 350 are defined by space and time coordinates of the contacts of the ends of the displacement members with a laying surface, also called 'laying prints', in a space reference system and in a time reference system.

Figure 4:
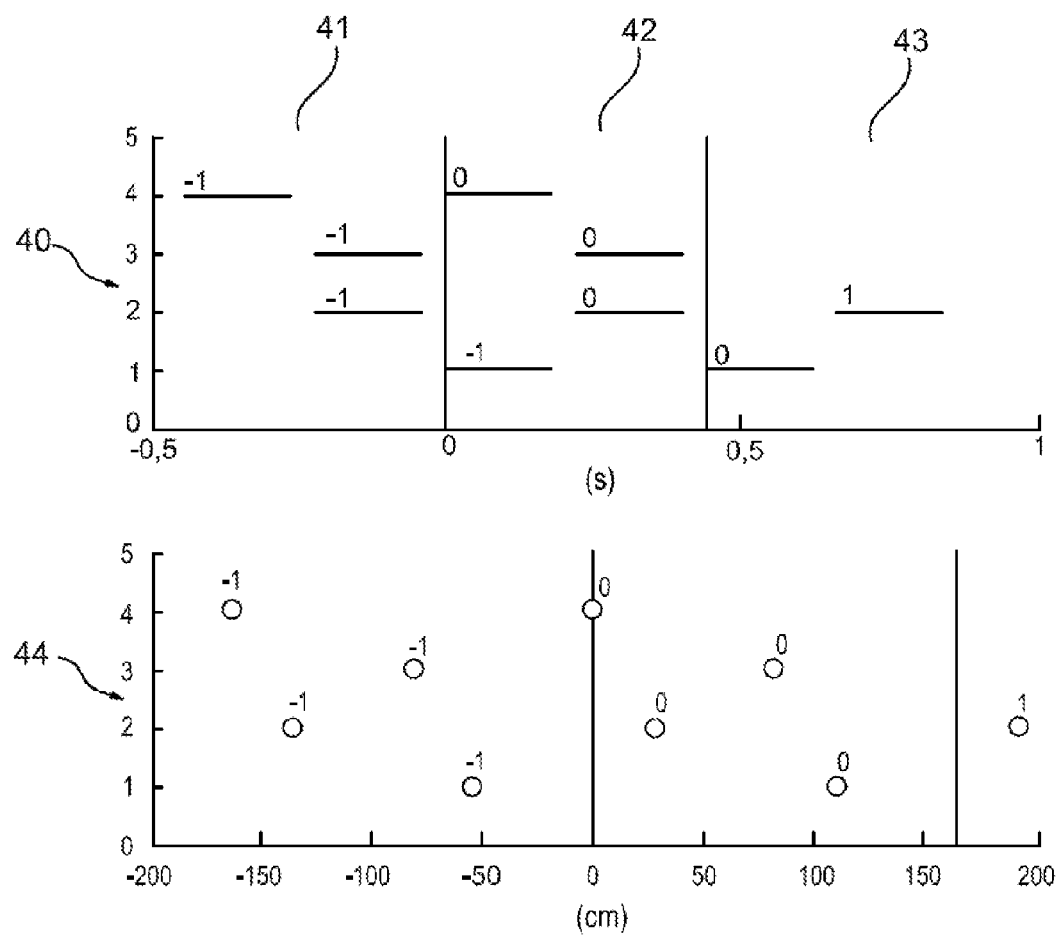
FIG. 4 is an example of sequences of coordinates for positioning displacement members of a quadruped in a space reference system and in a time reference system.

FIG. 4 illustrates an example of 'laying prints' graphs of each of the four legs of a quadruped, in a time reference system on the one hand and in a space reference system on the other hand, in the case of a displacement by trotting. It should be noted that for other displacement gaits, and other displacement speeds, the order and the generation of the 'laying prints' of the members will be different.

The space reference system is in the sagittal plane of the moving platform. These graphs model the displacement of the displacement members in a series of anteroposterior sequences or APS, described in the article <<A new way of analysing symmetrical and asymmetrical gaits in quadrupeds>> of A. Abcurachid, published in C. R. Biologies 326 (2003), pp. 625-630, which follow one another with overlapping in time.

APS is an organizational logic for the coordination of the members, different from time logic alone. An APS is the association of consecutive locomotive cycles of the fore limbs followed by the consecutive locomotive cycles of the hind limbs. An APS begins with a laying print of a selected reference fore limb and ends at the end of the locomotive cycle of a hind limb.

Each APS defines instants at which the end of each of the members, referenced by an associated reference number, is laid on the laying surface and is then raised again, as well as the location of the laying position or print in a space reference system.

The graph 40 comprises three intervals 41, 42 and 43 in which are concatenated the APS sequences of respective indexes –1, 0 and 1 in a time reference system. The reference numbers associated with the members are illustrated in ordinates, and the time instants in abscissae. The members are numbered from 1 to 4. The time axis is centered on the beginning of the APS 0 and in this example, extends from –0.5 seconds (s) to 1 s.

As this is seen in graph 40, for each APS sequence, it is the member for which the associated number is number 4 which is laid first and which is selected as a reference member or more generally a reference displacement member, for each of the APS sequences. Next the number 2 and 3 members are laid at the same time and finally member number 1 is laid, while the number 2 and 3 members are raised. It is seen that member number 1 of the APS sequence –1 is laid at the same time as member number 4 of the APS sequence 0, in the interval 42, which illustrates the time overlap of APS sequences modeling the movement coordination of the limbs of a quadruped in this example.

In parallel, the graph 44 illustrates the space coordinates of the prints of the laying members, therefore at the contact of the members with the laying surface in a space reference system, also centered on the beginning of APS 0. The axes of the ordinates of graph 44 represent the reference numbers associated with the members while the axis of abscissae represents the one-dimensional spatial positioning around the origin of the space reference system, between –200 cm and 200 cm in this example. Indeed in order to simplify the illustration, it is considered that the quadruped moves along a given direction, and therefore the space positioning coordinates are of one dimension in the sagittal plane.

In graph 44, are illustrated the space coordinates of the APS sequences of respective indexes –1, 0 and 1, the corresponding time coordinates of which are given in graph 40. Thus for example member number 4 of the APS sequence 0 is laid at the position of space coordinate 0 cm for 0.2 s between time instant 0 s and time instant 0.2 s. It should be noted here that the period of 0.2 s is specific to a given displacement speed.

In the preferred embodiment of the invention, each elementary displacement module models a succession of APS sequences, according to the module start speed and module end speed parameters.

The elementary modules associated with constant displacement gait comprise a succession of similar APS sequences, which therefore represent coordinations of similar displacement members, the space and time coordinates of the contact instants varying according to the time-dependent change between the module start speed and the module end speed.

The elementary modules associated with a displacement gait transition or with the starting and stopping locomotive situations comprise a succession of different APS sequences corresponding to different coordinations of the displacement members so as to model the transition between an initial displacement gait and a final displacement gait in addition to taking into account the respective module start and end speeds.

Figure 5:
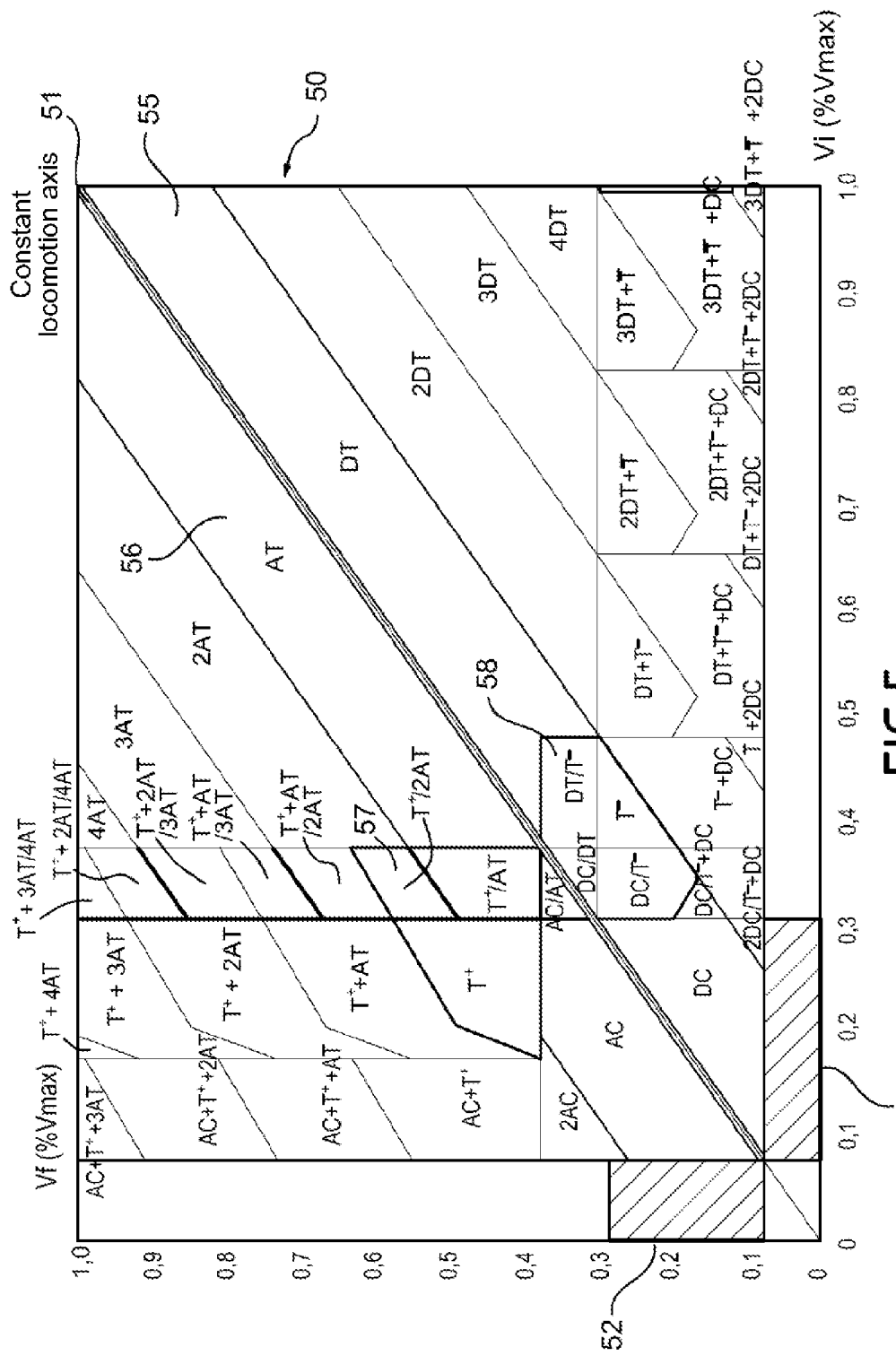
FIG. 5 is an example of a concatenation chart according to an embodiment of the invention.

The number of APS sequences described in an elementary displacement module depends on the type of gait, typically 3 APS sequences for example numbered as –1, 0 and 1 for an elementary module associated with a constant displacement gait like in the example of FIGS. 4, and 5 APS sequences for a sample numbered from –2 to 2 for an elementary displacement module associated with a displacement gait transition.

The first and the last of the APS sequences of each module are predictions of the <<laying prints>> for the members of the previous module and of the next module respectively in the sequence while assuming that these modules are associated with constant locomotion displacement.

FIG. 5 illustrates a concatenation chart of elementary modules 50 corresponding to various locomotive situations selected for a quadruped, obtained by observing the displacements of a shepherd dog. The axes respectively correspond to the normalized initial speed as a fraction of the maximum speed Vmax for the horizontal axis and to the normalized final speed as a fraction of the maximum speed Vmax for the vertical axis.

The main diagonal 51 represents the constant locomotion axis on which the initial and final speeds are equal and separates the chart 50 into two portions, the upper portion dedicated to acceleration, and the lower portion dedicated to deceleration. A starting module 52 with zero initial speed and a final speed comprised between 0.1 Vmax and 0.3 Vmax, and a stopping module 54 with an initial speed comprised between 0.1 Vmax and 0.3 Vmax, and the zero final speed are illustrated. These modules are used for particular starting and stopping situations. Biological observations have shown that the variation between 0 and 0.1

Vmax does not correspond to any gait of the walking, trotting type or other. This is a displacement mode of the pointing type in which the animal places one foot and then the other without any particular time synchronization.

Constant deceleration 55 and acceleration 56 gait modules as well as gait transition modules 57, 58 are illustrated in the chart 50, some being superposed such as modules 56 and 57 in order to form a complete chart of the areas of application of the various elementary displacement modules.

The displacement speeds above about 0.3 Vmax correspond to the <<trotting>> gait, but an overlapping area exists between the walking and trotting gaits located between 0.3 Vmax and 0.4 Vmax.

Thus, all the modules located above the main diagonal 51 noted as AT, 2AT, 3AT, 4AT correspond to accelerations in the trotting gait. For each elementary trotting acceleration module, the variation in speed between the module start speed and the module end speed is limited, typically comprised in a range for increasing the module start speed by a maximum of 15 to 25% of the maximum speed Vmax, which ensures realism and stability of locomotion.

The modules noted as DT, 2DT, 3DT, 4DT each correspond to trotting decelerations, also limited between the module start speed and the module end speed. For example, the module 2DT corresponds to applying twice the trotting deceleration mode DT.

The displacement speeds of less than about 0.38 Vmax correspond to a "walking" displacement gait, also designated as "crawl" or "walk". Thus the modules noted as AC, 2AC correspond to acceleration in walking and the modules DC, 2DC correspond to deceleration in walking. It should be noted here that the numerical values and the shape of the modules noted on the chart depend on the observed animal model for generating the chart.

The modules noted as T⁺ and T⁻, respectively the modules 57 and 58 of FIG. 5, are gait transition modules, with acceleration for the module T⁺ and deceleration for the module T⁻.

It is seen that on the concatenation chart 50 there is a superposition between the 'walking' and 'trotting' gait areas in a speed range comprised between 0.3 Vmax and 0.38 Vmax, i.e. the moving platform may be displaced in either one of these gaits in this speed range without losing any movement realism.

The selection of either one of the gaits may be made either by an operator, or by taking into account the prior displacement gait in a series of elementary displacement modules.

The gait transition modules 57 and 58 are superposed to acceleration and deceleration modules with constant gait. Preferably, in the speed area corresponding to the gait transitions, these gait transitions are applied in priority relatively to the modules corresponding to constant gait.

The shapes of the areas of application of the various elementary modules illustrated in the chart 50 are determined as a result of observations of displacement of a living quadruped. Advantageously, the modeling as a chart 50 of the biological observations ensures realistic and natural modeling of the locomotion gait transitions.

Generally, such a chart 50 illustrating areas of application of the elementary module is generated according to the moving platform.

Figure 6:
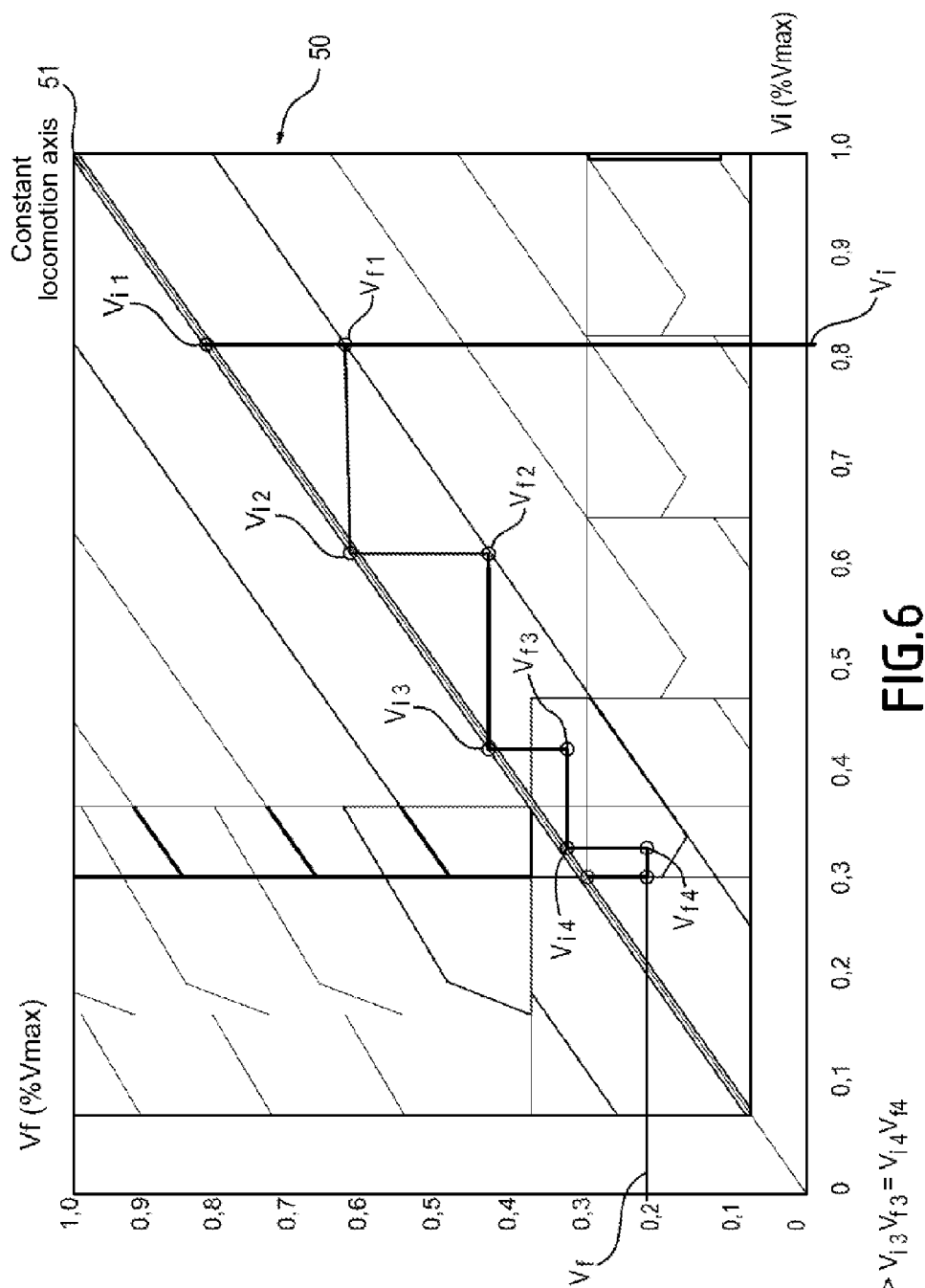
FIG. 6 illustrates an example of the use of the concatenation chart of FIG. 5.

An example of the use of the concatenation chart 50 for determining a series of elementary modules to be concatenated in order to pass from an initial speed of Vi=0,79 Vmax to a final speed of Vf=0,21 Vmax is illustrated in FIG. 6.

Here, it is sought to obtain a final speed of less than the initial speed, therefore this is a deceleration.

Point $Vi_1$ corresponding to the initial speed Vi is represented on the constant locomotion axis 51. The module start speed $Vi_1$ of the first module to be applied is reset to the initial speed Vi.

The initial point $Vi_1$ is located in a 'trotting' gait area. As a first module $M_1$, the trotting deceleration module (DT) is applied between $Vi_1=0.79$ Vmax and $Vf_1=0.61$ Vmax, which is the minimum speed which may be obtained upon applying the DT module starting from the module start speed $Vi_1=0.79$ Vmax, and which corresponds to a deceleration of 0.18 Vmax, i.e. 18% of the maximum speed of the moving platform.

The module $M_1$ end speed is used as a module start speed of the next module $M_2$: $Vi_2=0.61$ Vmax. The corresponding point $Vi_2$ is placed on the constant locomotion axis 51. The module allowing additional deceleration is again the trotting deceleration module, therefore the module $M_2$ is also the DT module between $Vi_2=0.61$ Vmax and $Vf_2=0.43$ Vmax.

The module $M_2$ end speed is used as a module start speed of the next module $M_3$: $Vi_3=Vf_2$. According to the chart 50, starting from the initial speed $Vi_3=0.43$ Vmax, one passes in the transition module T down to a final speed $Vf_3=0.32$ Vmax. The speed $Vf_3$ in this example corresponds to $(Vf_2+Vf)/2$, in order to homogenize the deceleration between $Vf_2$ and Vf. Other selections for $Vf_3$ within the limits of the boundary defined by the chart 50 are possible.

Next, by taking the module end speed of the transition module $Vf_3$ as the module start speed of the next module $M_4$, $Vi_4=Vf_3=0.32$ Vmax, according to the chart 50, a walking deceleration module (DC) is applied. This walking deceleration module is only applied up to the final speed, therefore the module end speed $Vf_4=Vf=0.21$ Vmax.

Figure 7:
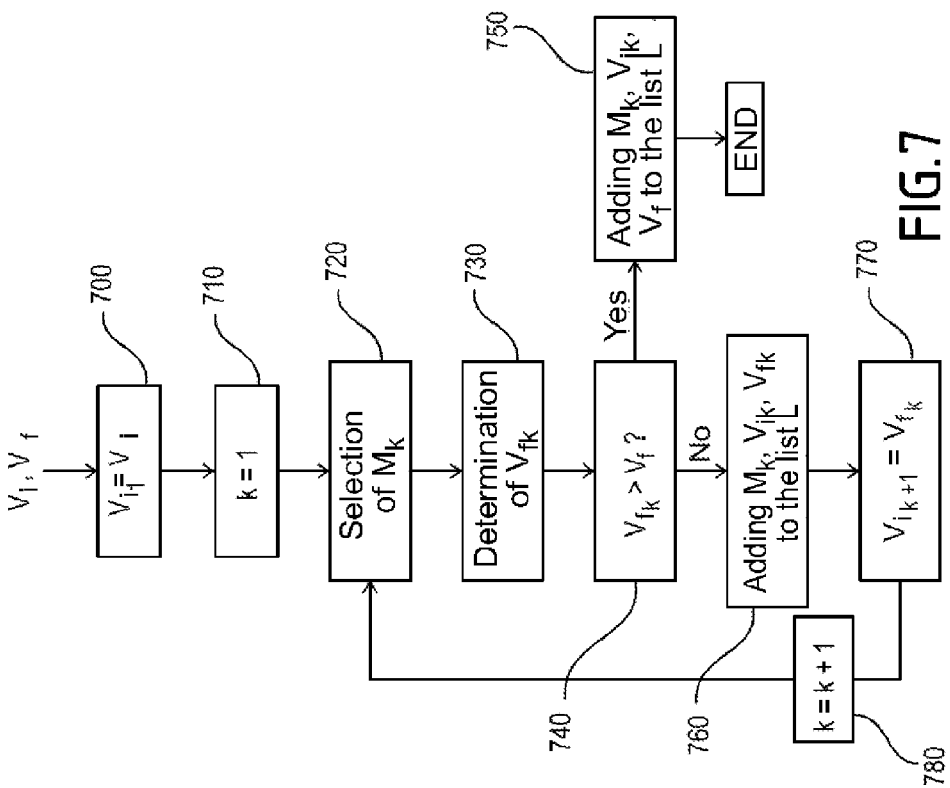
FIG. 7 is a flowchart of a method for determining a sequence of displacement modules according to an embodiment of the invention.

The flowchart of FIG. 7 illustrates the main steps of the method for determining a series of elementary modules to be concatenated using a chart of the elementary modules according to the invention. This flowchart details an application of step 340 of FIG. 3.

At the input, values of the initial speed Vi and final speed Vf parameters are received. In step 700, the module start speed $Vi_1$ of the first elementary displacement module is reset to the value Vi. In step 710, a variable k, representing the elementary module to be applied is reset to 1.

Next, by means of the concatenation chart of the displacement modules 50, and depending on whether this is an acceleration or a deceleration, which is determined by a comparison between the initial speed and the final speed, an elementary module $M_k$ is selected in step 720 in the concatenation chart of displacement modules 50.

The module end speed of the module $M_k$, $Vf_k$, which may be reached by applying the displacement module $M_k$ from the module start speed $Vi_k$ is determined in step 730. In practice, this speed $Vf_k$ may be directly read from the concatenation chart 50.

In the next step 740, it is checked whether the speed $Vf_k$ is greater than or equal to the expected final speed Vf, in order to determine whether by applying the module $M_k$ it is possible to attain the final speed Vf. In the case of a positive answer, the module $M_k$, as well as the start $Vi_k$ and end Vf application speeds are stored in memory in step 750 in the list L of modules to be chained together. The method terminates since the last selected module gives the possibility of attaining the final speed Vf.

In the case of a negative answer to the test 740, therefore if the final speed Vf is not yet attained, the module $M_k$ is added to the list L storing in memory a series of modules to be applied in step 760, with associated start $Vi_k$ and end $Vf_k$ speeds for its application.

Next in step 770, the module start speed, $Vi_{k+1}$, of the next module to be applied, $M_{k+1}$, assumes the value of the current module $M_k$ end speed: $Vi_{k+1} = Vf_k$, and the variable k is increased by one in step 780.

The step for selecting an elementary displacement module 720 already described is then applied again.

Thus, a series of modules to be concatenated is finally obtained, each between a module start speed and a module end speed, giving the possibility of obtaining fluid displacement in gaits and speeds between the initial speed Vi and the final speed Vf.

Figure 8:
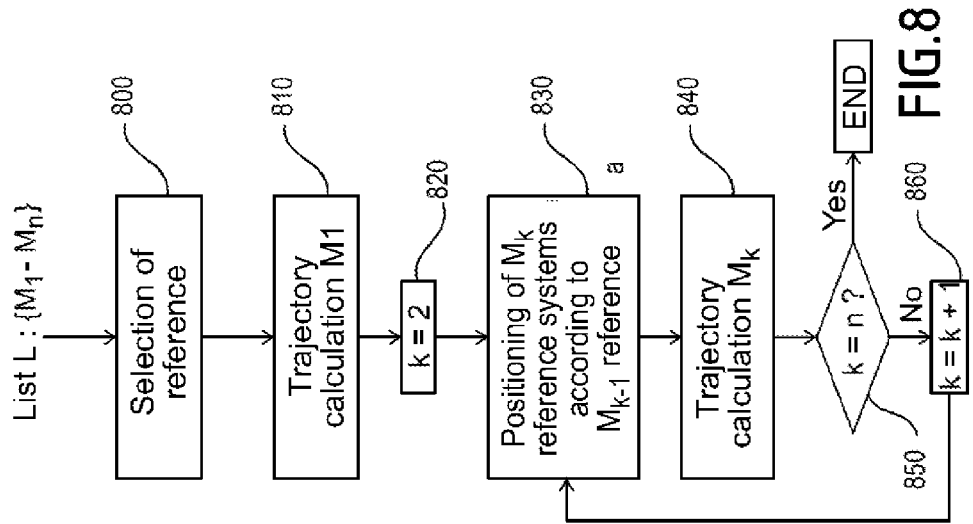
FIG. 8 is a flowchart of a method for concatenation of displacement modules according to the invention.

The flowchart of FIG. 8 illustrates the main steps of a method for concatenation of the series of elementary modules obtained for generating commands for controlling coordination of displacement members according to the invention. This flowchart details an application of step 340 of FIG. 3, in an embodiment in which the control commands are given by positionings of the displacement members in a space reference system on the one hand and in a time reference system on the other hand.

The series of elementary displacement modules to be concatenated obtained earlier is provided at the input of the method as a list L of modules to be applied, and of associated speeds.

During a first step 800, one of the displacement members is selected as a reference displacement member for the concatenation of the modules. Member number 4 of a quadruped which is the right fore limb in this example, which is already used as a reference displacement member in the representation as APS sequences, is selected as a reference displacement member.

Next in step 810, the whole of the commands controlling coordination from the first displacement module $M_1$, depending on the module start speed $Vi_1$ and on the module end speed $Vf_1$ are extracted. In this example, this is a trajectory expressed in space coordinates and time coordinates of the 'laying prints' for each of the limbs of the quadruped.

Next in step 820, a variable k is reset to the value 2.

The next displacement module to be applied is the module $M_k$ from the list L. in the next step 830, the space and time reference systems of the module $M_k$ are positioned relatively to the space and time coordinates of the reference displacement member at the end of the module $M_{k-1}$. As explained earlier, the last APS sequence of a module is a prediction of the 'laying prints' for the members of a next module. During this concatenation, the validity of this prediction is checked and adjusted if necessary.

Thus, it is possible to concatenate together the space and time positionings of the displacement members in a continuous way, the last APS sequence of a module fitting into the next module. Advantageously, this gives the possibility of obtaining stability and fluidity of the locomotive displacement.

The positioning of the space and time reference systems of $M_k$ then allows computation of the trajectory of 'laying prints' of the whole of the members in the module $M_k$, i.e. the whole of the space and time coordinates of the 'laying prints' of each of the displacement members.

In the next step 850, it is checked if the variable k has attained the value n, index of the last module in the series of modules to be concatenated. In the case of a positive answer, the method terminates.

In the case of a negative answer, the variable k is increased by one in step 860, and step 830 and the following steps are again executed.

Thus a set of coordinates for 'laying prints' of the legs stem from this method, this set representing commands for controlling the displacement members of a moving platform in this embodiment.

The complete trajectories of the ends of the members, giving the possibility of attaining the calculated space coordinates of the contacts with the laying surface, are obtained by using a predetermined trajectory model and then the whole of the movements of the members including the whole of the joints, is calculated by reverse kinematics by integrating the calculated space coordinates of the contacts with the laying surface, the position of the center of mass of the moving platform at each instant and the morphology of the platform.

The invention claimed is:

1. A method for generating commands for controlling coordination of displacement members of a moving platform, in order to have said moving platform progress between an initial speed and a final speed according to at least two locomotive situations, wherein:
   each locomotive situation is associated with a corresponding elementary module generating commands for controlling coordination between a predetermined start speed for the elementary module and a predetermined end speed for the elementary module, and
   application areas of these elementary modules are illustrated as a predetermined concatenation chart for concatenating adjoining modules covering at least partially, by juxtaposition of their start and end speeds, the spectrum of possible initial and final speeds of displacement of the platform,
   so as to allow determination of a series of elementary modules to be concatenated to pass from the initial speed to the final speed and concatenation of the modules of this series so as to derive therefrom a series of corresponding control commands for the displacement members of the moving platform.

2. The method for generating commands controlling displacement coordination according to claim 1, wherein said moving platform is a moving computer-generated imaging model.

3. The method for generating commands controlling displacement coordination according to claim 1, wherein moving platform is a robot.

4. The method for generating commands controlling displacement coordination according claim 1 wherein said elementary modules and said predetermined concatenation chart of the modules are obtained by modeling locomotive situations from observations of displacements of a living being.

5. The method for generating commands controlling displacement coordination according to claim 4, wherein the living being is a biped and the locomotive situations comprise starting, stopping, walking and at least one running mode.

6. The method for generating commands controlling displacement coordination according to claim 4, wherein the living being is a quadruped and the locomotive situations comprise starting, stopping, trotting, at least one walking type and at least one galloping type.

7. The method for generating commands controlling displacement coordination according to claim 1, wherein the variation range of module start and end speeds is comprised between 15% and 25% of the maximum possible speed of displacement of the platform.

8. The method for generating commands controlling displacement coordination according to claim 1, wherein said locomotive situations include at least two different displacement gaits and at least one gait transition, said moving platform progressing between the initial speed and the final speed according to at least two different displacement gaits while passing through a gait transition.

9. The method for generating commands controlling displacement coordination according to claim 1, wherein each elementary module delivers sequences of contact coordinates of these displacement members with a laying surface, in a space reference system and a time reference system.

10. The method for generating commands controlling displacement coordination according to claim 9, wherein during concatenation of the elementary modules, one of said displacement members is selected as a reference, and wherein its space and time contact coordinates are used for determining the space and time origins at the input of the next elementary module of the determined series of elementary modules.

11. A generator of commands for controlling coordination of displacement members of a moving platform, so as to have said moving platform progress between an initial speed and a final speed according to at least two locomotive situations, comprising:
  a memory; and
  a processor, wherein the processor is configured to access instructions stored in the memory and execute the instructions, wherein based on the instructions the processor is further configured to:
    associate each locomotive situation with a corresponding elementary module generating commands for controlling coordination between a predetermined start speed for the elementary module and a predetermined end speed for the elementary module;
    illustrate application areas of these elementary modules as a predetermined concatenation chart for concatenating adjoining modules covering at least partially, by juxtaposition of their start and end speeds, the spectrum of possible initial and final speeds of displacement of the platform; and
    allow determination of a series of elementary modules to be concatenated to pass from the initial speed to the final speed and concatenation of the modules of this series so as to derive therefrom a series of corresponding control commands for the displacement members of the moving platform.

12. The generator of commands of claim 11, wherein said moving platform is a moving computer-generated imaging model.

13. The generator of commands of claim 11, wherein the moving platform is a robot.

14. The generator of commands of claim 11, wherein said elementary modules and said predetermined concatenation chart of the modules are obtained by modeling locomotive situations from observations of displacements of a living being.

15. The generator of commands of claim 14, wherein the living being is a quadruped and the locomotive situations comprise starting, stopping, trotting, at least one walking type and at least one galloping type.

16. The generator of commands of claim 14, wherein the living being is a quadruped and the locomotive situations comprise starting, stopping, trotting, at least one walking type and at least one galloping type.

17. The generator of commands of claim 11, wherein the variation range of module start and end speeds is comprised between 15% and 25% of the maximum possible speed of displacement of the platform.

18. The generator of commands of claim 11, wherein said locomotive situations include at least two different displacement gaits and at least one gait transition, said moving platform progressing between the initial speed and the final speed according to at least two different displacement gaits while passing through a gait transition.

19. The generator of commands of claim 11, wherein each elementary module delivers sequences of contact coordinates of these displacement members with a laying surface, in a space reference system and a time reference system.

20. The generator of commands of claim 19, wherein during concatenation of the elementary modules, one of said displacement members is selected as a reference, and wherein its space and time contact coordinates are used for determining the space and time origins at the input of the next elementary module of the determined series of elementary modules.

* * * * *